US008015353B2

(12) United States Patent
Kabir et al.

(10) Patent No.: US 8,015,353 B2
(45) Date of Patent: Sep. 6, 2011

(54) METHOD FOR AUTOMATIC RAID CONFIGURATION ON DATA STORAGE MEDIA

(75) Inventors: Rezwanul Kabir, Austin, TX (US); Ahmad Ali, Austin, TX (US); Tesfamariam Michael, Raleigh, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/469,367

(22) Filed: Aug. 31, 2006

(65) Prior Publication Data

US 2008/0059698 A1  Mar. 6, 2008

(51) Int. Cl.
*G06F 12/00* (2006.01)
(52) U.S. Cl. ...................................... 711/114; 714/6.22
(58) Field of Classification Search .................. 711/114; 714/6.22
See application file for complete search history.

(56) References Cited

U.S. PATENT DOCUMENTS

| 6,098,119 | A   | * | 8/2000 | Surugucchi et al. ............ 710/10 |
| 6,952,794 | B2  |   | 10/2005 | Lu |
| 2002/0101711 | A1 | * | 8/2002 | Gold ............................. 361/685 |
| 2003/0070043 | A1 | * | 4/2003 | Merkey ......................... 711/114 |
| 2004/0019822 | A1 | * | 1/2004 | Knapp, III ........................ 714/6 |
| 2004/0030883 | A1 | * | 2/2004 | Munguia et al. .............. 713/100 |
| 2004/0073747 | A1 | * | 4/2004 | Lu ................................. 711/114 |
| 2005/0289296 | A1 | * | 12/2005 | Balasubramanian ......... 711/114 |
| 2006/0195658 | A1 | * | 8/2006 | Kanbe et al. .................. 711/114 |

OTHER PUBLICATIONS

Stotage Network Industry Association (SNIA), Common Disk Data Format Specification, Rev. 1.2, Jul. 28, 2006, pp. 1-99.*

* cited by examiner

*Primary Examiner* — Hashem Farrokh
(74) *Attorney, Agent, or Firm* — Garrana Tran LLP; Andrea E. Tran

(57) ABSTRACT

A method of configuring a virtual disk for an information handling system is disclosed. The method comprises embedding a data structure onto a data storage medium prior to installing the medium into an information handling system. The data structure makes up a default policy for configuration of a RAID container using the data storage medium and is recognizable by a controller. When the controller identifies the data structure the controller will read the data structure and configure the medium having the structure into a virtual disk such as a RAID container.

18 Claims, 4 Drawing Sheets

| | |
|---|---|
| LBA G | Free Space |
| | DDF Header (Secondary) |
| | Controller Data |
| | Physical Disk Records |
| | Virtual Disk Records |
| | Configuration Records |
| | Physical Disk Data Records |
| | Bad Block Management |
| | Diagnostic Space |
| | Vendor Specific Logs |
| | Reserved |
| | Free Space |
| | DDF Header (Primary) |
| | Controller Data << |
| | Physical Disk Records << |
| | Virtual Disk Records << |
| | Configuration Records |
| | Physical Disk Data Records << |
| | Bad Block Management |
| | Diagnostic Space |
| | Vendor Specific Logs |
| | Reserved |
| | Free Space |
| LBA M-1 | DDF Header (anchor) |

*FIG. 3*

METHOD FOR AUTOMATIC RAID CONFIGURATION ON DATA STORAGE MEDIA

BACKGROUND

1. Technical Field

The present disclosure generally relates to apparatuses, methods and products in the field of information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of several embodiments of the disclosure in order to provide a basic understanding of at least some embodiments of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows. All embodiments described in this disclosure including in the Summary and Detailed Description are intended to be non-limiting.

One embodiment of the disclosure provides a method of initializing a data storage medium comprising embedding data on an unconfigured data storage medium, wherein the data being embedded identifies a redundant array of independent disks (RAID) configuration.

Another embodiment described herein provides an apparatus having an apparatus for storing data comprising a data storage media having a RAID configuration, wherein RAID configuration data is embedded on the data storage medium.

Another embodiment provides a method of configuring a data storage medium into a virtual disk comprising communicating a data storage medium with an information handling system, determining if a RAID default configuration policy is on the data storage media, and configuring the virtual disk based on the RAID default configuration policy.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein:

FIG. 3 illustrates a non-limiting embodiment of a data structure; and

DETAILED DESCRIPTION

Figure 1:
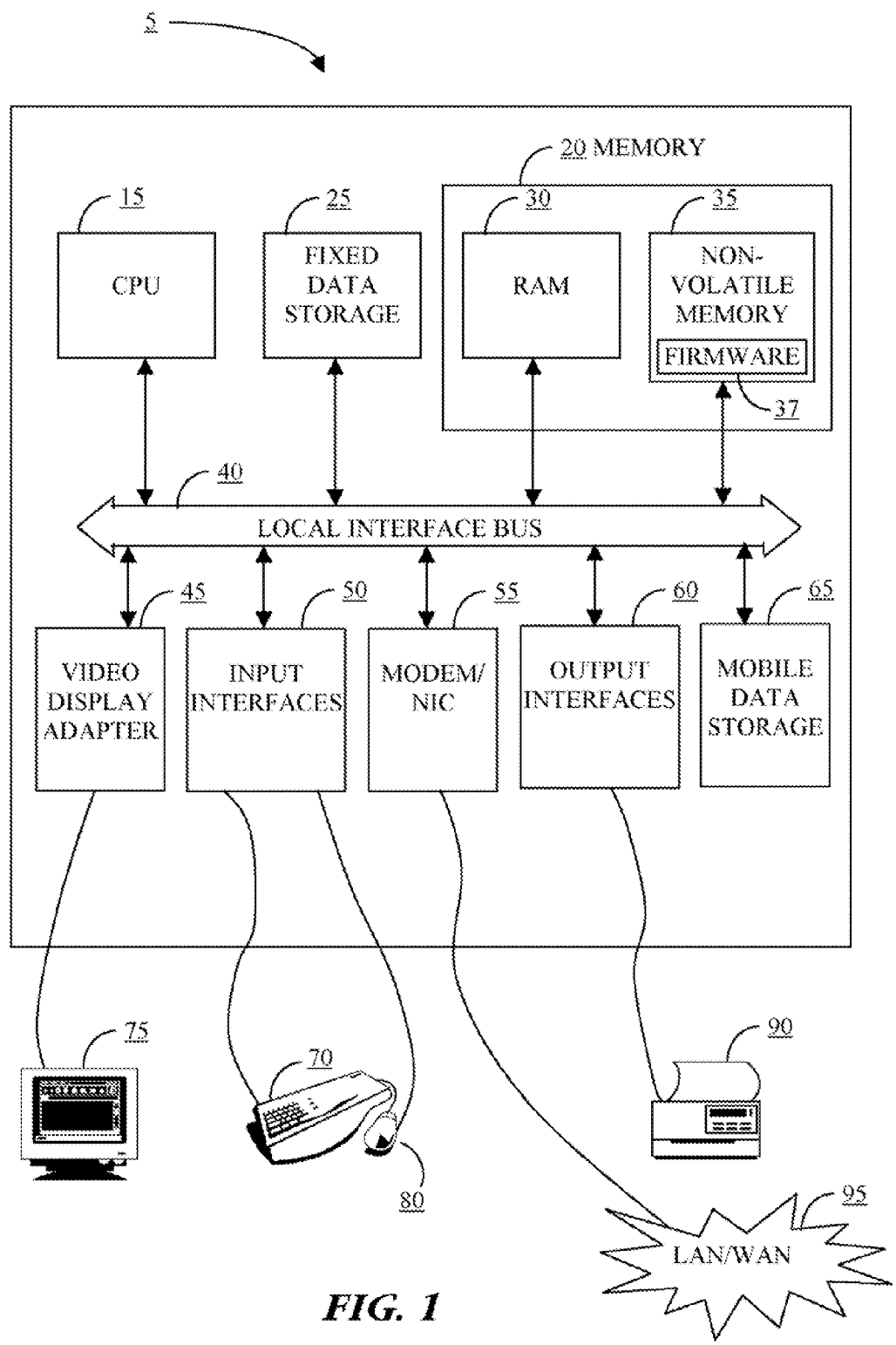
FIG. 1 schematically illustrates a non-limiting embodiment of an information handling system.

For purposes of this disclosure, an information handling system may include, but is not limited to, any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more data storage medium (such as a disk drive(s), a flash drive(s), a compact disk(s), combinations thereof, and the like), one or more network ports for communicating with external devices as well as various input and output (I/O) devices, such as a keyboard, a mouse, and a video display. The information handling system may also include one or more buses operable to transmit communications between the various hardware components.

When electrical power is applied to the IHS 5, a system start-up initialization program is automatically activated. The start-up initialization program, which may include a basic input output system (BIOS) program, may test the IHS hardware and connectivity perform runtime services, and load operating program that allows the IHS to perform needed tasks. The term BIOS was originally used by personal computer vendors to refer to a start up initialization program. The term has also become common for identifying start-up initialization program firmware used in other hardware devices such as network servers. Still other classes of computers use such generic terms as "boot monitor", "boot loader" or "boot ROM" to refer to the start up initialization program. Examples of a start-up initialization program include, but are not limited to: PC BIOS; Extensible Firmware Interface (EFI) BIOS; and Open Firmware. The term start-up initialization program is used herein to include all of the above described start up initialization programs. Additionally, firmware may also be resident in the IHS for controlling and/or communicating with for example, hard drives, network circuitry, and other peripheral devices. As used in this disclosure, a firmware program, also called a firmware image, includes any software embedded in an IHS device used to perform predefined tasks. For the purposes of this disclosure, the term "firmware" includes, but is not limited to, a start-up initialization program. Firmware may be stored in non-volatile memory. Non-volatile memory, as used herein, includes any memory device that does not lose stored data upon the loss of power.

FIG. 1 illustrates a non-limiting embodiment of an information handling system 5 comprising a CPU 15. It should be understood that this disclosure has applicability to information handling systems as broadly described above, and is not intended to be limited IHS 5 as specifically described. The CPU 15 may comprise a processor, a microprocessor, minicomputer, or any other suitable device, including combinations thereof, for executing programmed instructions. The CPU 15 may also comprise a plurality of such processors, microprocessors, minicomputers, and other devices. The CPU 15 may be in data communication over a local interface bus 40 with fixed data storage 25 and memory 20.

The memory 20, as illustrated in FIG. 1 includes a non-volatile memory 35 having a firmware program 37 optionally stored therein, such as an initialization start-up program. The non-volatile memory 35 includes, but is not limited to flash memory and electrically erasable programmable read-only memory (EEPROM). The firmware program 37 may contain, all the programming instructions required to control a keyboard 70, a display monitor 75, a mouse 80, a mobile data storage 65, other input/output devices not shown here, and a number of miscellaneous functions and/or devices. The memory 20 may also comprise a random access memory (RAM) 30. The OS and application programs may be loaded into RAM 30 for execution.

A fixed data storage device 25 may be used to store the OS, application programs, and other data for use by the IHS 5. A fixed data storage device refers to non-volatile storage devices including permanent and/or semi-permanent storage devices. Fixed data storage devices may include but are not limited to, a hard disk drive (HDD) and a magnetic tape drive. In addition, a mobile data storage device 65 may interface with a local interface bus 40 for transferring data to and/or from IHS 5. Examples of mobile data storage include, but are not limited to: an external portable hard drive; a solid state semiconductor storage device, such as flash memory; and an optical disc storage device, such as a compact disc (CD) and/or a digital video disc (DVD).

The IHS 5 may further comprise a video display adapter 45, a plurality of input interfaces 50, a modem/network interface card (NIC) 55, and a plurality of output interfaces 60. Output interface 60 may transmit data to printer 90 for printing.

The IHS 5 may be coupled to an external network 95 through NIC 55 thus allowing the IHS 5 to send and receive data via the external network 95 to and from a remote device. As shown, the external network 95 may be a local area network (LAN)$_1$ a wide area network (WAN), including the Internet, or any other similar network. As provided in FIG. 1, the IHS 5 may operate as a personal computer, a network storage device, a network server, or any other enabled information handling device.

In one non-limiting embodiment, the fixed data storage 25 comprises a redundant array of independent disks (RAID) container. Data storage media configured into a RAID format can enhance system performance and data protection. A RAID format couples together multiple data media (such as a series of individual computer disks) each with certain storage capacity into a single "virtual disk" comprising the total storage capacity of these multiple mediums. This activity of data access is performed across multiple physical media. The single virtual disk may replace the use of a single expensive large disk. Thus, other than acknowledging several different mediums, the information handling system having a RAID configured virtual disk sees only one. Additionally, this single RAID virtual disk can significantly enhance data accessing and storage because this is performed on smaller less expansive media.

For purposes of the present disclosure, the RAID configured media described herein is not limited to a single RAID type but can include multiple levels—either currently known RAID types or those future developed. These differing RAID levels provide different methods of creating redundant information on the associated media. When a RAID configured data storage medium, such as a disk drive, is damaged or disconnected, redundant configured data is generated. The regenerated redundant data can then be used to rebuild the configuration information completely.

Many RAID levels exist, they include but are not limited to, RAID 0, JBOD, RAID 1, RAID 2, RAID 3, RAID 4, RAID 5, RAID 5 with hot spare, RAID 6, RAID 0+1; RAID 10, RAID 100 (10+0), and RAID 50 (5+0). The more common RAID levels are RAID 0, RAID 1, RAID 5, and RAID 5 with hot spare.

Media configured as a RAID 0 is stripped such that the data is distributed among a number of strips that are stored across the disk drives in the array. Stripping simulates a medium having a much larger capacity by using many mediums having smaller capacity to improve the performance of data accessing. This configuration however provides no redundancy for the recovery of media failure. A RAID 0 splits data evenly across two or more data storage media with no parity information for redundancy. RAID 0 was not one of the original RAID levels and is not redundant. While a RAID 0 virtual disk can be created with media of differing sizes, the capacity of each medium is limited to the size of the smallest medium.

A RAID 1 configuration uses "mirroring", that is, data on one medium is duplicated onto another distinct medium thereby protecting against data loss. While this has proven to be an effective way to protect data, it does require a large amount of storage space. Therefore, the efficiency of this method is approximately one half of the total capacity of the media making up the RAID 1 virtual disk.

Systems employing a RAID 5 configuration use parity for redundancy of data. When configured data is embedded onto a RAID 5 array with configured data, redundant data is generated that corresponds to the data being embedded and then creates and stores redundant data in an equivalent sized media. Thus if the array is made of X media, the media capacity will be approximately X−1.

The methods, apparatus and products herein disclosed also may include simple and span storage types; which are not RAID configured types. These can be used on a continuous space on storage media without redundancy data. The span type concatenates storage units of a simple type as a logical storage unit. The logical storage unit of span type has no redundancy data but provides flexibility for utilizing storage space.

A typical virtual disk can comprise a number of distinct data storage media. Storage of the configuration information associated with each medium may be arranged into specific media, such as logical disk drives or volumes with various RAID or non-RAID levels. A logical disk drive or a volume is formed by sub-drives of physical disk drives in a same disk drive group, and the volume layout structure of a disk drive group can be described by the constituent logical disk drives and structure of volumes in the group.

Operation of a RAID configured media may require a RAID controller for controlling data to and from the RAID configured media. A RAID controller is a device that can be used to manage one or more arrays of RAID configured media. However, if a system contains no RAID controller, a software program accessed by an information handling system can be used as a RAID controller.

Figure 2:
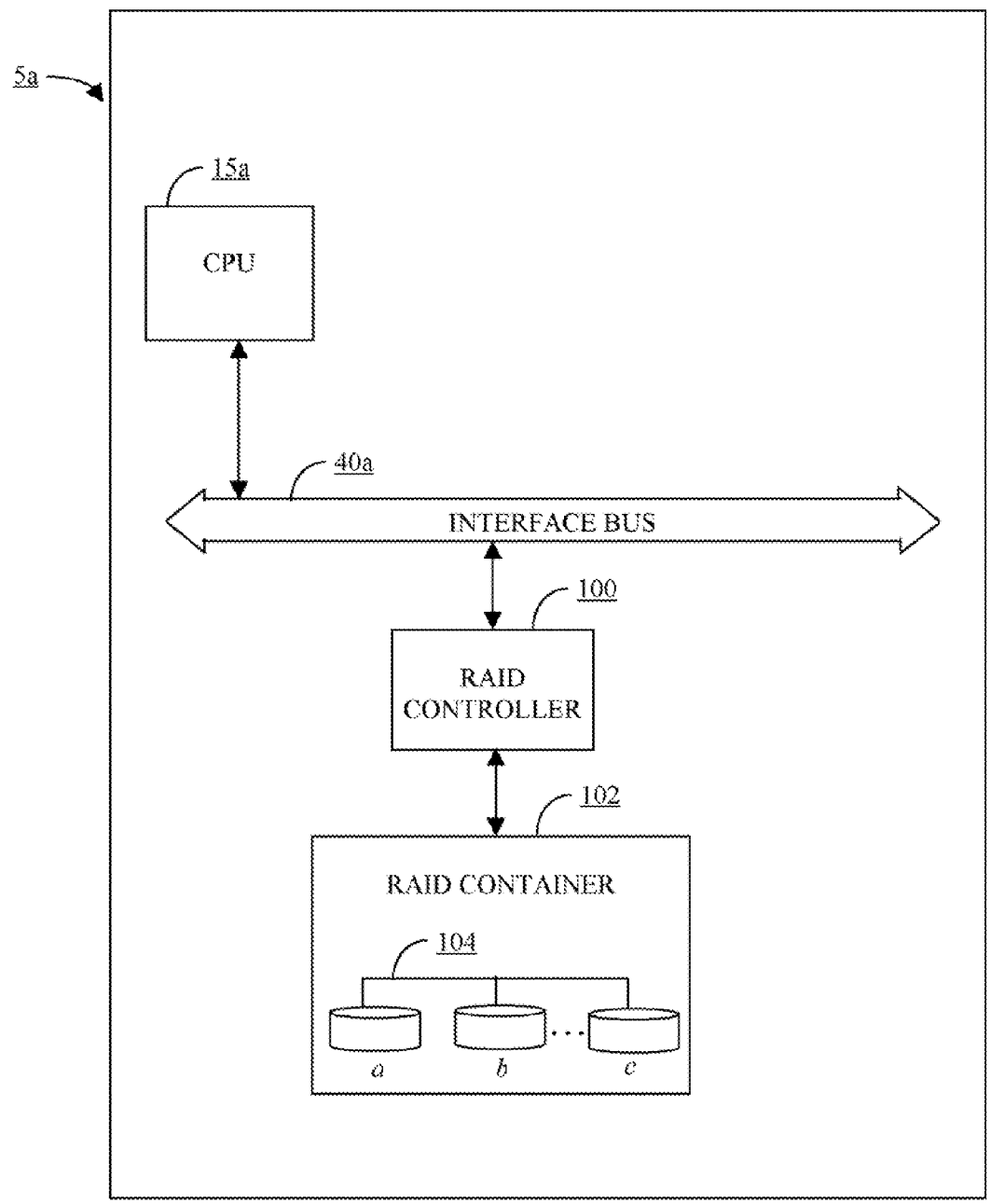
FIG. 2 schematically illustrates a non-limiting example of an information handling system in communication with a RAID controller and RAID container.

FIG. 2 provides a non-limiting illustration of an information handling system 5a having a central processing unit 15a combined with a RAID controller 100 and a RAID container 102. It should be pointed out that the information handling system 5a of FIG. 2 can include all the components and peripherals of the information handling system 5 of FIG. 1, however for the sake of clarity, the components illustrated in FIG. 2 have been limited. In the information handling system 5a of FIG. 2, the central processing unit 15a communicates with the RAID controller 100 via a local interface bus 40a. The RAID controller 100 may comprise a Peripheral Compound Interface (PCI) express card, a Small Computer System Interface (SCSI), or a Serial Attached SCSI (SAS). The RAID container 102 comprises one or more data storage mediums 104a, b, . . . , x configured into a virtual drive. The data storage mediums may comprise disks such as hard drives, floppy drives, compact disks, as well as flash memory, optical media and the like.

In one non-limiting embodiment of a method of the present disclosure, a RAID configuration policy is stored or embedded onto the data storage medium before it is installed into an information handling system (5, 5a). The default RAID configuration policy structure can be stored in a mode page or included with the data disk format of the medium. In another non-limiting embodiment, the data structure is configured such that RAID controller or the system in which the medium is installed can detect the configuration policy. Optionally, the data structure can be configured to be ignored by RAID controllers if a RAID configuration is not possible or if the RAID controller logic/code does not recognize the configuration information on the medium.

In one example, data representing a default RAID configuration policy can be stored on a medium within data disk format (DDF) structure. An inherent property of DDF, described in its specification, may be that the format can be identified by a plurality of RAID controllers. FIG. 3 may illustrate one such DDF structure using the following:

---
\* DDF_Header->Foreign_Flag
\*Controller_Data->Controller_GUID
\*Controller_Data->Controller_Type
\*PD_Recoreds->Populated_PDEs
\*PD_Records->PDE#1->PD_Type->Bit_1
\*VD_Records->Populated_VDEs
\*PD_Data->Vendor_Specific_Scratch_Space
---

Controllers or systems having the above policy are capable of identifying media as foreign (i.e. a medium that is installed into a system after the initial RAID container configuration) by accessing DDF_Header_GUID and Controller_GUID. One example of enabling a controller or system accessing these fields to determine that the media having these fields in its DDF structure is not a part of an existing RAID virtual disk is by the presence of the Populated_PDEs and Populated_VDEs fields in the DDF structure. One example of enabling the controller or system accessing these fields to determine that the media having these fields in its DDF structure has a default configuration policy identifying the media as having a RAID policy or configuration is by setting Controller_GUID the same as PD_GUID. Optionally, a disk default RAID configuration policy in accordance with the present disclosure can be created by revising currently used installed data disk formats without creating an entirely new structure.

Figure 4:
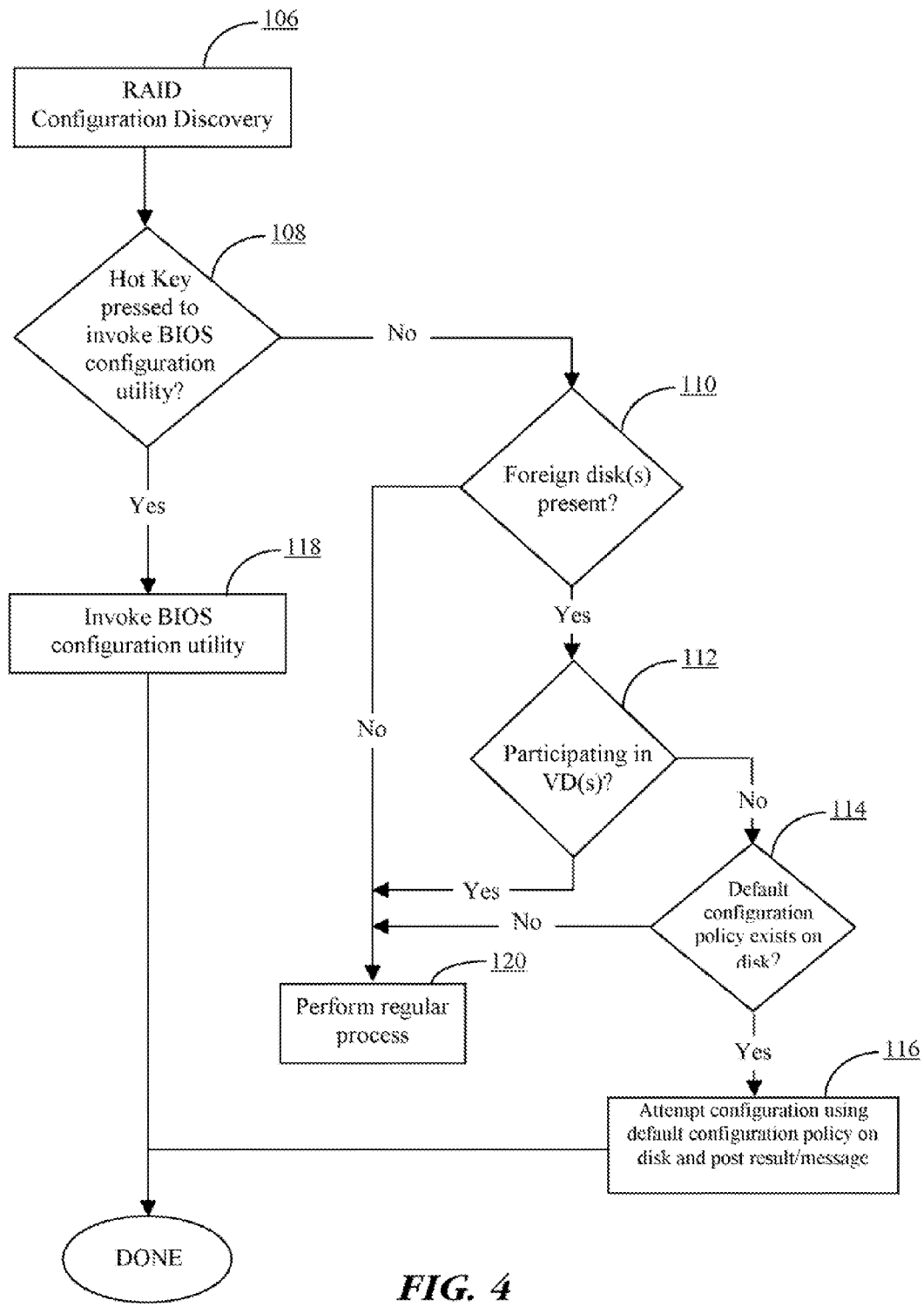
FIG. 4 is a flowchart illustrating a non-limiting embodiment of a method of creating a virtual disk.

Methods of this disclosure may include at least one of the steps shown in FIG. 4, FIG. 4 provides an example of a method for detecting a default RAID configuration policy on a data storage medium and creating RAID configuration using this policy. Optionally, the controller or system can perform the RAID configuration automatically; also optionally, the configuration can occur during system initialization or boot up. In one example of use, the configuration policy as described herein can be embedded onto a data storage medium that are unconfigured (also known as "fresh"). Unconfigured mediums includes those newly manufactured as delivered from the manufacturer or used mediums whose entire data had been wiped clean, the controller or system accessing the medium can read the policy embedded on the medium and configure the data storage medium into a virtual disk per the default policy.

In the non-limiting embodiment of FIG. 4, a controller of an information handling system queries a data storage medium and discovers a RAID configuration embedded on the medium (step 106). In response to identifying the presence of the RAID configuration, the option of using a hot key to invoke a BIOS configuration utility is available (step 108). In the method of FIG. 4, if the hot key is not activated the controller determines if a foreign disk is present in the information handling system (step 110). If the hot key is pressed, a BIOS configuration utility is invoked (step 118). If no foreign disk is found, regular processes of the information handling system are performed (step 120).

Upon the determination that a foreign disk is present the next query asks if the medium is a part of a currently configured virtual disk (step 112). If the medium is found to be participating within a currently defined RAID container the method of FIG. 4 may proceed to step 120. If the medium is found to not be a part of a virtual disk a query of its default configuration policy may be made (step 114). If a default configuration is not found the method may proceed to step 120; if on the other hand a default configuration policy is found on the medium the controller may attempt to configure the medium into a virtual disk (or RAID container) using the default configuration policy located on the medium. Optionally the steps of FIG. 4 can be posted in a post result/message for viewing such as by the user of the information handling system.

In one non-limiting example of the method herein described, two RAID-1 virtual disks can be created by embedding the following data values in the policy fields of four different data storage media:

---
Max_Primary_Element_Count = 0x0002
Primary_RAID_Level = 0x01
RAID_Level_Qualifier = 0x00
Max_Secondary_Element_Count = 0x01
Secondary_RAID_Level = 0xFF
---

In another non-limiting example of the method herein described, one RAID-0 virtual disk can be created by embedding the following data values in the policy fields of four different data storage media.

```
Max_Primary_Element_Count = 0x0016
Primary_RAID_Level = 0x00
RAID_Level_Qualifier = 0x00
Max_Secondary_Element_Count = 0x01
Secondary_RAID_Level = 0xFF
```

In yet another non-limiting example of the method, if two of the four media contained one of the above values in their policy fields and the other two contained the other above set of data values in their policy fields, a controller sensing these fields could create one RAID-1 virtual disk and one RAID-0 virtual disk.

The method herein described also applies to situations where media is added to an existing system. For example, in a field or customer environment where an information handling system already has configured virtual disks, an unconfigured medium added to the system having the above noted configuration policy may be configured by a controller (such as the RAID controller 100) into a virtual disk per the data found in the configuration policy.

In another non-limiting embodiment, the method herein described can include a RAID controller having a timer to detect the installation of each unconfigured medium having a RAID configuration policy. At the termination of each time cycle, the controller could be set to assume that all new media has been installed into the system and an automatic configuration sequence could be initiated based on the configuration policy embedded on the installed media.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A method comprising:
    storing data on an unconfigured data storage medium, wherein the data identifies a redundant array of independent disks (RAID) default configuration policy stored on the unconfigured data storage medium, and wherein the RAID default configuration policy is written in a format that can be identified by a plurality of distinct RAID controllers;
    adding the unconfigured data storage medium to an information handling system (IHS); and
    creating a virtual disk after adding the unconfigured data storage medium to the IHS and detecting the RAID default configuration policy.

2. The method of claim 1 wherein storing further comprises:
    storing the data on two or more data storage media.

3. The method of claim 1 further comprising:
    storing data on a RAID controller to facilitate communication of the controller with the unconfigured data storage medium.

4. The method of claim 1 wherein the step of identifying the unconfigured data storage medium as a RAID container is selected from the group consisting of identifying the container as a RAID 0 container, a RAID 1 container, a RAID 2 container, a RAID 3 container, a RAID 4 container, a RAID 5 container, and a RAID 6 container.

5. The method of claim 1, wherein the unconfigured data storage medium is selected from the group consisting of a hard disk, a floppy disk, a flash disk, and a compact disk.

6. The method of claim 1, wherein the IHS comprises a RAID controller.

7. The method of claim 6 further comprising:
    providing communication between the unconfigured data storage medium and the RAID controller.

8. An apparatus for storing data comprising:
    a data storage medium having a RAID default configuration policy stored thereon, wherein the data storage medium is otherwise unconfigured, and wherein the RAID default configuration policy is written in a format that can be identified by a plurality of distinct RAID controllers; and
    an information handling system (IHS) in communication with the data storage medium, the IHS operable to create a virtual disk and to detect the RAID default configuration policy after adding the data storage medium to the IHS.

9. The apparatus of claim 8 wherein the data storage medium further comprises two or more data storage media.

10. The apparatus of claim 8, wherein the IHS further comprises a RAID controller.

11. The apparatus of claim 8 wherein the RAID default configuration data comprises data selected from the group consisting of a RAID 0 container, RAID 1 container, RAID 2 container, RAID 3 container, RAID 4 container, RAID 5 container, and a RAID 6 container.

12. The apparatus of claim 8 wherein the data storage medium is selected from the list consisting of hard disk, a floppy disk, a flash disk, and a compact disk.

13. A method comprising:
    adding an unconfigured data storage medium to an information handling system (IHS),
    the unconfigured data storage medium includes data that identifies a RAID default configuration policy stored on the unconfigured data storage medium, and wherein the RAID default configuration policy is written in a format that can be identified by a plurality of distinct RAID controllers; and
    attempting detection of the RAID default configuration policy after adding the unconfigured data storage medium to the IHS and prior to creating a virtual disk.

14. The method of claim 13, further comprising:
    providing a post message providing information concerning the method.

15. The method of claim 13 further comprising:
    creating a virtual disk based on the RAID default configuration policy.

16. The method of claim 13 further comprising:
    invoking a basic input output system (BIOS) configuration utility for configuring the virtual disk.

17. The method of claim 13 wherein the RAID default configuration policy comprises data selected from the group consisting of a RAID 0 container, RAID 1 container, RAID 2 container, RAID 3 container, RAID 4 container, RAID 5 container, and a RAID 6 container.

18. The method of claim 13 wherein the unconfigured data storage medium is selected from the group consisting of hard disk, a floppy disk, a flash disk, and a compact disk.

* * * * *